United States Patent Office 3,743,620
Patented July 3, 1973

3,743,620
POLYURETHANE SOLUTIONS AND METHODS FOR THE PRODUCTION OF UNIFORMLY MICROPOROUS POLYURETHANE SHEET MATERIAL THEREFROM
Bernard Frye, Waldwick, N.J., assignor to Tenneco Chemicals, Inc.
No Drawing. Filed Dec. 10, 1970, Ser. No. 97,040
Int. Cl. C08g 51/44
U.S. Cl. 260—32.6 NR                                    1 Claim

ABSTRACT OF THE DISCLOSURE

A solution of a polyurethane polymer containing a substance, such as an alkali metal halide, to improve the properties of a microporous film prepared from the solution and a process for preparing a uniformly microporous film from such a solution are provided.

---

Solutions of polyurethane polymers are presently widely used for the preparation of microporous polyurethane products. Such products include uniformly microporous, translucent or opaque film; the opacity of the film depending upon the thickness and the orientation of the molecules of the film. The polyurethane polymer solutions can also be used for the production of microporous bulk sheets or blocks of foamed polyurethane polymer and for the impregnation of fibrous webs, bats or mats of flexible fibrous materials.

These porous materials generally permit the transmission of moisture vapor while preventing the transmission of liquid water. The microporous polymeric films and foams have found particular use in the preparation of synthetic leathery products for use, for example, as shoe-uppers, in the manufacture of garments, upholstery covering, handbags and the like.

In the preparation of the microporous flexible films or the preparation of the microporous foamed blocks or impregnated foamed products, the polymer is preferably precipitated from solution by introducing a non-solvent liquid for the polymer which is wholly miscible with the solvent in which the polymer is dissolved. Upon the introduction of the non-solvent, the polymer begins to coagulate and deposit as a film or layer. Upon the complete removal of the solvent and drying of the deposited layer, a flexible, elastomeric uniformly microporous film is desirably formed. Such "microporous" products, as the term is used in the art and as it will be used in the present specification, are formed of cellular polymers in which the cells are connected and are generally not visible, even at 100× magnification. Microporous materials, especially films which are suitable for use in the production of the top layer of leather-like products, must be substantially uniform and free of both impermeable nonporous (or collapsed) areas and of macrovoids or excessively large cells. Macrovoids are larger than desired cells, often visible to the naked eye especially when a film, for example, is stretched and held in front of a light.

Polyurethane polymer solutions do not give consistently uniform cast products, especially after they have been aged; aging is often indicated by the solution's tending to thicken, becoming more viscous. Macrovoids and impermeable areas alternate with the desired microporous, moisture vapor-permeable areas, giving a non-uniform low quality product, often having decreased mechanical strength as well as a less desirable appearance.

It is now believed that both the thickening of polymer solution and the decreased quality of cast products prepared therefrom are caused, at least in part, by the formation of secondary chemical or intermolecular bonds, e.g. hydrogen bonding or solvation by polyurethane polymer molecules in solution. Means have now been discovered that improve the quality of a microporous film or block cast from a solution of a polyurethane polymer, but which surprisingly, do not decrease viscosity, or prevent thickening, of the polymer solution with aging. Generally, the improvement comprises an increase in the flex strength of the product, an increase in moisture vapor transmission by the microporous product and an improvement in appearance by reason of a more uniform microporosity.

In accordance with the present invention, a polymer solution suitable for forming cast, preferably uniformly, microporous elastomeric film is provided, the solution comprising a solvent and dissolved therein a polyurethane polymer and a flex strength- and microporosity-improving, aggregation-inhibiting substance, suitably a lithium halide or sodium iodide. It is believed the substance acts by disrupting or interfering with any hydrogen bonds or other secondary chemical bonds and intermolecular forces that may have been formed or tended to be formed by the polymer molecular in the solution.

This invention further provides an improved process for preparing a microporous polyurethane product, the process comprising providing a polyurethane solution comprising urethane polymer, a solvent for the urethane polymer and a flex strength- and microporosity-improving substance, contacting the polyurethane solution with a liquid substantially miscible with the solvent, and which is preferably also a solvent for the substance, but which is a non-solvent for the polyurethane polymer, the non-solvent liquid being present in an amount sufficient to cause the polymer to precipitate out of solution and form a layer of polyurethane polymer, and removing the solvent and dissolved aggregation-inhibiting substance from the layer of polymer to form a microporous polyurethane product.

The preferred microporosity- and flex strength-improving aggregation-inhibiting substances are the lithium halides, especially lithium chloride, and sodium iodide. When dissolved in a polyurethane polymer solution, in accordance with the present invention, these salts appear to strongly interfere with hydrogen bonding and other types of intermolecular bonding by the polyurethane molecules, and possibly solvating thereof. It is believed that the effectiveness of the alkali metal halides is at least partially due to the fact that these are among the most polar of compounds, that is, they comprise the most negative elements of the periodic table, i.e. the halides, and one of the most positive elements, i.e. lithium or sodium.

The substances are to be preferably used with those polymer solvent and non-solvent combinations in which the salt is soluble. Water, the most commonly used non-solvent, is a sufficient solvent for lithium chloride and sodium iodide. Similarly, lithium chloride and sodium iodide are soluble in dimethyl formamide, the most commonly used polymer solvent. It is preferred that there be no excess undissolved solid substance present in the polyurethane solution as may interfere with the usefulness of the solid polymer product. It is also desirable that, e.g. the lithium halide be removed from the polyurethane polymer after the polymer has been precipitated. It is, therefore, most important that the microporosity-improving substance not precipitate when the polymer non-solvent is added, but preferably be soluble in the non-solvent at least to the extent necessary to remove all of the metal halide during the precipitation stage and subsequent washing.

The lithium halides and sodium iodide have shown the desired effect in improving the quality of the microporous product with as little as about 0.10% by weight of polyurethane polymer of dissolved sodium iodide or lithium halide. Preferably from about 0.2 to about 1.25% by weight of dissolved polyurethane polymer of the halide should be used. Generally, there is no maximum amount of halide or other substances, that can be added up to the limits of solubility in the polymer solvent and non-solvent, but it has been generally found that if more than about 1% by weight of dissolved polymer of a halide is present, the excess does not appear to provide any additional effectiveness in improving the microporous product. Generally, the halide is present in a concentration of at least about 0.02% by weight of the solution and preferably at least 0.05% by weight of solution.

Polyurethane polymers are generally characterized by containing in their polymer chain the urethane group:

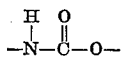

This group can be presently combined with many other types of organic linkages including ether, ester, biuret, allophanate and amide groups. A polyurethane should preferably contain at least about 3% by weight of the urethane group.

The common polyurethane elastomers for use in the solutions of this invention are generally defined as the reaction products of a prepolymer and a chain-extending reagent. That is, they are prepared by a two-stage process: a prepolymer is first formed, which is then reacted with a chain-extending reagent. The prepolymer is the reaction product generally of an organic di- or polyisocyanate with an active hydrogen-containing polymeric material, such as hydroxy-terminated polyester or polyether, or the polyester of a hydroxy acid, such as the triglyceride of ricinoleic acid, which is the primary constituent of castor oil. Other possible reactants with the di- or polyisocyanates include amides, urethanes and ureas and can include, in part, amino compounds having active hydrogen atoms, such as diamines, as well as such compounds as polythioethers having active hydrogen atoms and water.

Chain-extending reagents reactive with the prepolymer have at least two active hydrogen atoms. Such compounds include water, hydrazines, polyols, especially glycols, amino alcohols and polyamines.

Another type of polyurethane can be prepared by reacting an organic diamine with the bis-haloformate of a glycol and a polyurethane ether glycol, as described, e.g., in U.S. Pat. No. 2,929,802 to Katz.

The most common type of polyurethane elastomers which can be used in the present invention, are prepared from a prepolymer formed by first reacting, preferably a molar excess of a di- or polyisocyanate with a hydroxyl-terminated polymeric diol. Alternatively, a two-stage process can be carried out where the isocyanate is first reacted with a molar excess of the hydroxy-containing material, and this is then followed by a second stage reaction with additional diisocyanate to complete the reaction.

Aromatic, aliphatic and cycloaliphatic isocyanates or mixtures thereof can be used in forming the prepolymer. These include, diisocyanate, triisocyanate and higher polymers. Examples include tolylene-2,4-diisocyanate; tolylene-2,6-diisocyanate; m-phenylene diisocyanate; biphenylene 4,4'-diisocyanate; methylene bis-(4-phenyl isocyanate); 4-chloro-1,3-phenylene diisocyanate; naphthalene-1,5-diisocyanate; tetramethylene-1,4-diisocyanate; hexamethylene-1,6-diisocyanate; decamethylene-1,10-diisocyanate; cyclohexylene-1,4-diisocyanate; methylene bis (4-cyclohexyl isocyanate) and tetrahydronaphthalene diisocyanate. Arylene diisocyanates, that is, isocyanates in which the isocyanate groups are attached to an aromatic ring are more economical and therefore are preferred, unless resistance to discoloration is important. In general, the arylenes diisocyanates react more readily than do alkylene or cyclo alkylene diisocyanates.

Polyalkylene ether and ester glycols, each alone or in admixture, are the most commonly used active hydrogen-containing polymeric materials for prepolymer formation for reasons of availability and economy. For example, polyethyleneether glycol, polypropylene ether glycol, polytetramethyleneether glycol, polyhexamethyleneether glycol, polyoctamethyleneether glycol, polynonamethyleneether glycol, polydecamethyleneether glycol, polydodecamethyleneether glycol, and mixtures thereof. Polyglycols containing several different radicals in the molecular chain such as, for example, the compound $HO(C_3H_6O)_n-(C_2H_4O)_mH$. Minor proportions of other reactants, including nonpolymeric glycols, can be used.

Polyester glycols which can be used alone or in conjunction with the polyalkylene ether glycols can be produced by reacting aliphatic, cycloaliphatic or aromatic diacids or other bi-reactive acidic; compounds with a glycol. Suitable glycols are polymethylene glycols, such as ethylene, propylene-, tetramethylene-, decamethylene, hexamethylene glycols, substituted polymethylene glycols such as 2,2-dimethyl-1,3-propanediol, cyclic glycols, such as cyclohexanediol and aromatic glycols such as xylylene glycol. Aliphatic glycols are generally preferred when maximum product flexibility is desired. Acids suitable for preparing such polyesters are, for example, succinic, adipic, suberic, maleic, sebacic, terephthalic and hexahydroterephthalic acids and the alkyl- and halogen-substituted derivatives of these acids.

A one-shot polymerization process to form a polyester polyurethane polymer can be carried out by reacting the prepolymer polyester with the polyisocyanate and chain extender simultaneously. An example of this type of process is the ring opening reaction of a cyclic ester, such as epsilon caprolactone, in the presence of an initiator such as a glycol, e.g. 1,4-butylene glycol, followed by reaction with a diisocyanate together with additional extender, such as 1,4-butylene glycol.

During the chain extension reaction, the prepolymer molecules are joined together into a substantially linear polyurethane polymer.

Useful chain extending reagents include water, glycols, such as ethylene glycol, 1,2-propylene glycol, 1,4-butylene glycol, neopentyl glycol, diethylene glycol, dipropylene glycol and xylene glycol and 2,2-bis (hydroxyethylphenyl) propane; amino compounds such as hydrazine, N-methyl-bis amino propylamine, ethylenediamine, hexamethylene-diamine, phenylenediamine, methylenedianiline, cyclohexyl-bis-methylamine, xylylenediamine, toluenediamine, benzidine, naphthylenediamines, ethanolamine, propanol-amine and hydroxyethylaminoacetate.

Generally, therefore, the most commonly used urethane polymers are derived from polyesters or polyethers and are known as polyester or polyether polyurethane. Such terms encompass all polymers made from such esters and ethers regardless of the chain-extending reagent used, and include, therefore, the so-called urethane-urea polymers, prepared from an amine-containing chain-extending reagent.

The above reactions can be carried out in the solvent which will be used as the carrier or solvent for the polyurethane solution of the present invention. A preferred solvent for the polyurethane elastomer is N,N-dimethyl formamide which has a high solvent power for the polymer molecules and further is miscible with water, a preferred nonsolvent or precipitating agent for the polymer molecules. Other solvents for the polyurethane polymers which are also useful in the present invention include, dimethyl sulfoxide, tetrahydrofuran, tetramethyl urea, N, N'-dimethyl acetamide, N-methyl-2-pyrrolidone, ethyl acetate, dioxane, butylcarbinol, gamma-butyrolactone, tetramethylene urea and tetramethylene sulfone. Where it becomes desirable, in very few cases, to use precipitants other than water, such polymer solvents as camphor, xylene, methylene dichloride, toluene, isopropanol and Cellosolve-acetate-MEK-perchloroethylene, might also be used. This is not generally recommended, since lithium halides are generally not soluble in those solvents, unless they contain major portions of more polar solvents. In addition, the precipitation non-solvent, e.g. hexane or kerosene, is more expensive to use than water. Blends with the preferred solvents can be used in this invention with a lithium halide and other water-miscible liquids such as ketones, e.g. methylethyl ketone and acetone, alcohols, lower aliphatic esters, such as ethyl acetate, or cyclic ethers, such as dioxane, which alone may be poor solvents for the polymer. One example of a useful blend is dimethylformamide and methyl ethyl ketone comprising no more than about 20% of the methyl ethyl ketone.

The polyurethane polymer is present in the solution in a proportion of at least about 5% by weight of the solution and preferably at least 10% by weight up to about 50% and optimally from about 15 to about 35% by weight. Generally, at below 10% by weight polymer, the rate of precipitation is too slow and the film properties can be affected; at concentrations above 40%, the viscosity can be too great for easy handling, but such high concentration solutions can be used in special circumstances. The most desirable viscosity ranges vary depending on the manner in which the solution is applied to a substrate. For example, where the solution is intended to be applied onto a substrate with a doctor knife, the preferred solution viscosity is from 1000 to about 50,000 cp. The viscosity can, of course, be varied as desired by varying the molecular weight or concentration of the dissolved polymer or by adding materials such as cellulose ether, e.g. methyl cellulose, depending upon the desired method of application. Various other additives such as stabilizer, coloring agents, plasticizers and the like can be added to the elastomer solution to enhance the properties or appearance of the final microporous product.

In addition, other polymers or elastomers may be mixed with the polyurethane polymer to change or improve the properties of the film product in a desired manner. For example, polyvinyl chloride dissolved in the solution is a particularly useful adjunct used in combination with polyurethane when it is desired to prepare a flexible material useful for the preparation of shoe-uppers, or the like. A major proportion of polyurethane, i.e. at least more than 50% by weight of polymer, is usually present in the solution. However, for other purposes a major proportion of polyvinyl chloride can be present in the polymer. Even in the latter case, the addition of the substance has the desired effect of reducing any hydrogen bonding caused by any polyurethane which may be present. Of course, the smaller the proportion of polyurethane present, the smaller will be the effect of the substance in improving any microporous product prepared therefrom.

Other polymers which can be present in admixture with the polyurethane in accordance with the present invention include other vinyl halide polymers, other vinyl polymers, polyamides, polyester amides, polyesters, polyvinyl butyral, poly(alphamethyl styrene), polyvinylidene chloride, the esters of acrylic and methacrylic acids, copolymers of butadiene and acrylonitrile, cellulose esters and ethers and polystyrene. In addition, the polyurethane component can include a combination of two or more types of polyurethane if desired for a particular purpose. For example, a mixture of the ester-type and the ether-type polyurethanes is encompassed within the scope of the present invention.

In carrying out the process of this invention, the preferred miscible non-solvents for causing precipitation of the polyurethane polymer is water, or water-solvent mixtures, when using the preferred polymer solvents, e.g. dimethyl formamide and dimethyl sulfoxide. For other solvents, perhaps a carefully adjusted dioxane-water-hexane combination would be useful as a miscible non-solvent for the polymer.

In carrying out the above process and in preparing the polyurethane solution in accordance with the present invention, the aggregation inhibiting substance, the solvent for the polyurethane polymer, and the non-solvent used as the precipitating agent should be selected such that the polymer solvent is miscible with the nonsolvent and the aggregation inhibiting substance, is soluble in both liquids and in mixtures of the two liquids. For example, lithium chloride is soluble in both dimethyl formamide and water and in mixtures of the two. It would be a simple matter for one skilled in the art to determine the various solubilities of other combinations of solvent-nonsolvent-substance even if it becomes necessary to carry out the necessary simple experiments to determine the degree of solubility of e.g., a particular lithium halide, in any given solvent or solvent pairs to determine whether a particular compound would be useful in a particular process situation.

In this process the polyurethane polymer can be made to precipitate or coagulate from the solution by contacting with a nonsolvent by various methods. For example, the solution of the polyurethane polymer can be absorbed by, or coated on top of, a substrate which is then immersed in a nonsolvent, causing coagulation and precipitation of the polyurethane on or within the substrate. The nonsolvent and solvent can then be readily removed. Such a process is set out, for example, in U.S. Pats. Nos. 3,208,875, 3,000,757 and 3,190,765.

Preferably, in order to attain the desired microporous film in the most uniform quality, without the formation of macrovoids or of non-porous collapsed areas, the coagulation of the polyurethane from the solvents is best achieved by coating the polymer solution onto a substrate onto which it is desired to coat the film, the substrate being wetted with a liquid which is a nonsolvent for the polymer. The liquid from the wet substrate diffuses into the polymer solution, causing precipitation of the polyurethane polymer as a microporous film substantially free of macrovoids onto the substrate. The film is then washed free of solvent in a bath of the nonsolvent. A more complete explanation of this process is set forth in U.S. Pat. No. 3,284,874.

The polyurethane polymer solution of the present invention can be prepared by any of the conventional methods. If the polymer is prepared in solution, the solvent which is used in the polymerization reaction can be retained as the solvent in the solution according to the present invention. Alternatively, if the polymer component is obtained in pure form, it can be dissolved in any of the desired solvents set forth above together with any of the other additives which may be desired, including a second polymer as set forth above, or any additives, stabilizers, pigment filler or any other desired material. For example, see U.S. Pat. No. 3,067,482.

The aggregation-inhibiting substances, e.g. a lithium halide, in accordance with the present invention can be added to the polyurethane solution at any time. Preferably, the polymer is prepared in a relatively concentrated solution, which is then diluted with solvent containing dissolved, e.g., lithium halide salts. The substance can, if desired, be added to and mixed with the prepolymer during the polymerization reaction; however, care must be taken with certain lithium halides, specifically, e.g. lithium chloride, which are catalysts for certain undesirable side reactions in the pre-polymerization stage. Accordingly, the lithium chloride, should not be added at a point during or before a given stage of the polyurethane polymer preparation at which the material will have an undesirable effect on the polymer production. Accordingly, for example, in the case of lithium chloride, the lithium chloride can be added at any time subsequent to the completion of the preparation of the prepolymer, including before the addition of the chain extender, after the chain extending reaction has occurred and the complete polymer prepared, or together with or after the addition of any of the secondary additives present along with the polyurethane polymer, including any second polymer present.

For certain purposes it is desirable that the polymer solution also contain inert, insoluble organic or inorganic particles varying in size up to 150 microns. The weight of the particles in the solution can vary from about 30 to 120 parts by weight of inert particles per 100 parts by weight of the dry polyurethane polymer. The solutions preferably contain no more than from about 50 to about 80 parts by weight of the inert insoluble particles which include materials such as charcoal, aluminum dust and other metallic powders, leather dust, nylon, oxides of silicon, such as the dioxide, silicate compounds, oxides of the alkaline earth metals and talc. A particularly preferred type of particle is a microporous, microcrystalline cellulosic particle which is commercially available under the name Avicel; see a process for the preparation of such materials in Industrial and Engineering Chemistry, vol. 54, No. 9, pp. 20–29, Sept. 19, 1962. The presence of these particles or any of the other additives referred to above do not generally have any effect on the activity of the aggregation-inhibiting substance in accordance with the present invention.

It has further been found that the present invention can be utilized to improve the properties of already aged polyurethane solutions, including various products that are available commercially and which have been stored for a length of time sufficient to result in an undesirable increase in viscosity of the solution, and which have failed to produce uniformly high quality microporous films, either because the film collapsed or formed macrovoids. It has been found that when a sufficient amount of alkali metal halide is added to such an aged polymer solution, wherein the aging is the result of hydrogen bonding or other intermolecular force, the addition of alkali metal halide not only retards but reverses the process, resulting in a solution which can be used to prepare a uniformly microporous polyurethane film or layer having substantially improved moisture transmission properties and flex strength. It can be determined whether intermolecular forces are involved by heating the solution; aging due to hydrogen bonding or other similar force is reversed by heating.

Although this invention finds particular use in solutions which are used in the preparation of elastomeric films or in the process for preparation of elastomeric films, the invention, including the solution and the process, can be utilized to provide for the deposition of the elastomer in a bulk form such as to prepare a filler material in the preparation of synthetic leathers in accordance with the process more completely set forth in copending application Ser. No. 780,988, and generally referred to above.

The following examples will illustrate certain preferred embodiments of the present invention but are not intended to in any way limit the scope of the present invention.

EXAMPLES 1–4

A solution of a urethane-urea polymer in dimethyl formamide, containing 25% by weight polymer, was prepared as follows:

A bout 500 parts by weight of polyethylene glycol adipate having a molecular weight of about 1000 dissolved in dimethyl formamide (Formez F10–13) was reacted with about 200 parts by weight of p,p'-methylenediphenyl diisocyanate at about 70–80° C. for a period of about 2 hours. p,p'-Methylene dianiline (230 parts) was added and the chain extension reaction was maintained for an additional 30 minutes before the methanol chain stopper (3 g.) was added. The reaction was permitted to continue for another 30 minutes before cooling. Four other polyurethane polymer solutions were made in identical manner but lithium chloride was added together with or after the methylene dianiline in an amount by weight of the final polymer shown in Table I.

After being stored for 5 days each solution was coated onto the top surface of a glass plate using a Gardner knife to form a film about 35 wet mils thick. The coated plate was then immersed in a water bath to coagulate the polymer. The film was washed with additional water, dried in an air oven at 70° C. and examined for microporosity. The polyurethane films formed without LiCl showed a certain amount of macrovoids, the polyurethane film that did contain lithium chloride, showed a uniformly microporous layer, free of macrovoids, see Table I.

TABLE I

| Example | Percent by weight LiCl (of polymer) | Appearance |
| --- | --- | --- |
| Comparative | 0 | Macrovoids visible. |
| 1 | 0.2 | Almost no macrovoids. |
| 2 | 0.33 | Uniformly microporous, no macrovoids or collapsed areas visible. |
| 3 | 0.75 | Do. |
| 4 | 1.0 | Do. |

EXAMPLE 5

Several lots of a commercially sold polyurethane polymer solution (prepared from polyethylene glycol adipate, p,p'methylenediphenyl diisocyanate, and p,p'methylene dianiline in a 25% by weight solution in dimethyl formamide) that had been excessively aged were rejected as being not useful for the preparation of coagulated film of polyurethanes which were dense and uniformly microporous. A solution for the preparation of a commercial microporous film was compounded as follows:

| Composition: | Parts by wt. |
| --- | --- |
| Polymer | 100 |
| Avicel (regenerated cellulose) | 16.5 |
| Cab-O-sil (silica) | 1.65 |
| Carbon black (in vinyl) | 0.25 |
| Dimethyl formamide | 25.0 |

A coagulated layer was formed as follows from the above composition:

The solutions were pre-coagulated with 10% by weight of 50/50 dimethyl formamide/water solution. Wet films, 35 mils thick, were cast on a glass plate, coagulated by immersion in a bath of 70/30 dimethyl formamide/water solution and washed with water. The films were dried for 1 hour at 50° C. and examined under a microscope for microporosity. The same procedure was followed with several other lots of the same polyurethane solution to which had been added 1% by weight of the polymer of lithium chloride. The film prepared without lithium chloride collapsed to become substantially impermeable. The films prepared with 1% LiCl were uniformly dense and microporous.

EXAMPLE 6

Tests were carried out to determine the effectiveness of the present invention for the preparation of the grain layer, or top layer, of synthetic leather.

Fibers of 100% 1.5 denier by 1.5-inch nylon 66 are air-laid on a webbing machine to produce a fleece of 3 oz./sq. yard. This fleece is integrated with 0.025 inch thick sheet of polyester polyurethane foam having a density of approximately 1.5 lb./cubic foot, by needle-punching to obtain 600 penetrations per square inch from the fiber side (300 penetrations at $^{11}\!/_{16}$-inch depth, 300 penetrations at $^{7}\!/_{16}$-inch depth).

The web with the fiber side up is then brought into contact with a newly laid fleece of a 2:1 blend of 1.5 denier by 1.5-inch nylon 66 and 1.5 denier by 1.5-inch polyester fiber. The fleece density is 1.5 ounces per square yard. It is again passed through a needle loom with the fiber side up to produce a composite web. The penetration density is 600 penetrations per square inch at %2-inch depth.

The resulting composite web is compressed in a rotary press during a dwell time of one minute at a belt pressure of 5 lbs./sq. inch while applying heat to the fiber side at 315° F. to cause the ester fiber to bond to the nylon fiber at spaced apart points.

The composite web is then impregnated with a polyester polyurethane elastomer solution in dimethyl formamide having a 15% solids concentration, and containing 1% LiCl, and passed through metering rolls so that the total wet add on is 500%. The elastomer is the reaction product of the ester of diethylene glycol and adipic acid, reacted with toluene diisocyanate to form a prepolymer which is then chain extended with p,p'-methylene dianiline.

The impregnated web is next passed into a water bath so as to deposit the elastomer in the composite web. The water bath is equipped with rollers to move the product along. The product is washed with water by passing it through a second water bath similarly equipped with rollers and finally dried in an air oven at 70° C.

The dried substrate thus produced is immersed in an aqueous bath. The wetted product is squeezed through rollers to produce a wet substrate having no visible surface film of liquid. The aged polyurethane polymer composition of Example 5 is then knife-coated onto the surface to produce a film approximately 35 mils thick wet. The bottom surface of the coated substrate is laid down on an endless, porous belt of wool felt which is saturated with water. Almost immediately the polymer film starts to deposit on the surface of the substrate. At the end of ten minutes the polymer is completely deposited and the film-coated substrate is then passed through squeeze rolls, and into a water tank for washing. The washed product is dried in the air oven at 70° C. and is useful as a replacement for natural leather.

Samples were prepared by the above procedures from the polymer compositions of Example 5 that contained 1% LiCl, and that did not contain any LiCl. The completed product was examined for surface appearance and the appearance of a cross-section cut of the material and was tested to failure for flex strength. The results are as follows:

|  | 1% LiCl | Control |
|---|---|---|
| Viscosity cps. (77° F.) | 5,290 | 3,950. |
| Surface structure | Dense, smooth | Open, voids. |
| Cross-section | Dense, macrovoid free. | Macrovoids. |
| Flex | 100,000 cycles, no failure. | 20,000, fine cracks. |
|  | do | 35,000, failed. |

EXAMPLE 7

The procedure of Example 1 is repeated but the polyurethane polymer is dissolved in butylcarbinol in place of the dimethyl formamide. The same results are obtained in improving the quality of the film produced by the addition of the lithium chloride.

EXAMPLE 8

The procedure of Example 1 is repeated, but substituting sodium iodide for the lithium chloride. The same results are obtained in improving the quality of the film produced by the addition of the sodium iodide as with the lithium chloride.

The material of this invention and the process of this invention can be utilized for example in the processes set forth in U.S. Pat. No. 3,208,875 for the preparation of vapor-permeable sheet materials and in the processes of, e.g. U.S. Pat. No. 3,284,874. In accordance with the processes set forth in the latter patent, the present invention can be utilized in the preparation of the microporous film or in the preparation of a filler or stuffing material for filling a web formed of a mat of fibers and polymeric foam prepared as the substrate in the preparation of a synthetic leather. In addition, of course, the property of the lithium halides and other substances in accordance with this invention in improving the tensile strength of the final film make this invention useful in the preparation of various non-elastomeric foamed materials and unfoamed materials.

The following is claimed as the patentable embodiments of the above defined invention:

1. A polymer solution suitable for forming a microporous film comprising a solvent, a polyurethane polymer selected from the group consisting of the reaction products of a di- or polyisocyanate and a hydroxy-terminated polyether or polyester dissolved therein, and sodium iodide dissolved therein in amount sufficient to improve the microporosity and flex strength of a polyurethane film prepared from the soltuion.

References Cited

UNITED STATES PATENTS

| 3,068,188 | 12/1962 | Beste et al. | 160—30.2 |
| 2,980,651 | 8/1961 | Farago | 260—77.5 |
| 2,692,874 | 10/1954 | Langerak | 260—77.5 |
| 2,929,800 | 4/1960 | Hill | 260—77.5 |
| 3,076,770 | 9/1958 | Saunders | 260—2.5 |

MORRIS LIEBMAN, Primary Examiner

R. ZAITLEN, Assistant Examiner

U.S. Cl. X.R.

260—336 UR